(12) United States Patent
Zhou et al.

(10) Patent No.: US 8,771,546 B2
(45) Date of Patent: Jul. 8, 2014

(54) BORATE LUMINOUS MATERIAL AND PREPARATION METHOD THEREOF

(75) Inventors: Mingjie Zhou, Shenzhen (CN); Chaopu Shi, Shenzhen (CN); Rong Wang, Shenzhen (CN); Wenbo Ma, Shenzhen (CN)

(73) Assignee: Ocean's King Lighting Science & Technology Co., Ltd., Shenzhen (CN)

( * ) Notice: Subject to any disclaimer, the term of this patent is extended or adjusted under 35 U.S.C. 154(b) by 167 days.

(21) Appl. No.: 13/512,755

(22) PCT Filed: Dec. 4, 2009

(86) PCT No.: PCT/CN2009/075304
§ 371 (c)(1),
(2), (4) Date: May 30, 2012

(87) PCT Pub. No.: WO2011/066685
PCT Pub. Date: Jun. 9, 2011

(65) Prior Publication Data
US 2012/0235093 A1    Sep. 20, 2012

(51) Int. Cl.
*C09K 11/78* (2006.01)
*C09K 11/77* (2006.01)

(52) U.S. Cl.
CPC .......... *C09K 11/778* (2013.01); *C09K 11/7797* (2013.01); *C09K 11/7712* (2013.01)
USPC ................................................. 252/301.4 R

(58) Field of Classification Search
USPC ................................................. 252/301.4 R
See application file for complete search history.

(56) References Cited

U.S. PATENT DOCUMENTS

| | | | | |
|---|---|---|---|---|
| 7,088,036 B2 * | 8/2006 | Kanda et al. | | 313/495 |
| 2005/0001532 A1 | 1/2005 | Srivastava et al. | | |

FOREIGN PATENT DOCUMENTS

| CN | 1328526 A | 12/2001 |
|---|---|---|
| CN | 1560187 A | 1/2005 |
| CN | 1712490 A | 12/2005 |

OTHER PUBLICATIONS

"The luminescence properties of Na2(Y1-xEux)2B2O7 and Y1-xEuxCa3(AlO)3(BO3)4 under VUV excitation", Lingli wang and Yuhua Wang, Materials Science and Engineering B, 2007, vol. 139, pp. 232-234.
"Luminescence properties of Eu3+, Tb3+ or Tm3+ activated Ca4GdO(BO3)3 under X-ray and UV excitation", Cheng-jun Duan et al, Optical Materials, 2006, vol. 28, pp. 956-961.
"The VUV—vis spectroscopic properties of phosphors Ca3Gd2(1-x)Ln2x(BO3)4 (Ln3+ =Ce, Sm, Eu, Tb)", Hongbin Liang et al, Materials Research Bulletin, 2006, vol. 41, pp. 1468-1475.
"Emission analysis of Pr3+ & Ho3+: Ca4GdO(BO3)3 powder phosphors", B.Vengala Rao'S. Buddhudu, J Mater Sci, 2008, vol. 43, pp. 233-236.
"White-light-emitting diodes of UV-based Sr3Y2(BO3)4:Dy3+ and luminescent properties", Panlai Li et al, Materials Letters, 2008, vol. 62, pp. 1455-1457.
"Luminescent properties of (Y,Gd)BO3:Bi3+,RE3+ (RE=Eu, Tb) phosphor under VUV/UV excitation", Xiaoqing Zeng et al, Journal of Luminescence, 2006, vol. 121, pp. 1-6.

* cited by examiner

*Primary Examiner* — Carol M Koslow
(74) *Attorney, Agent, or Firm* — Shimokaji & Associates P.C.

(57) ABSTRACT

Borate luminous material is provided, wherein, comprises the compound of following structural formula: $M_2(Re_{1-x}Ln_x)_2B_2O_7$, wherein x is in a range of $0<x\leq0.5$, M is alkali metal element, Ln is at least one of Tm, Tb, Eu, Sm, Pr, Dy, Ce and Bi, Re is selected from one or more element of Y, Gd, Sc, Lu and La. The preparation method of borate luminous material also is provided. The borate luminous material has the advantages of good stability, high luminescence efficiency and high color purity.

9 Claims, 5 Drawing Sheets

BORATE LUMINOUS MATERIAL AND PREPARATION METHOD THEREOF

FIELD OF THE INVENTION

The present invention relates to the field of luminous material, and specifically to borate luminous material and preparation method thereof.

BACKGROUND OF THE INVENTION

Flat panel displays have always been one of the displays that people are continuously pursuing to develop, and field emission display is one of them. In the 1960s, Ken Shoulder proposed the idea based on field emission cathode arrays (FEAs) cathode ray micro devices, thus the researches of using FEAs to design and to prepare flat panel displays and light source devices have received great attentions. The working principle of the new type field emission devices is similar to that of the traditional cathode ray tube (CRT), the application of imaging or lighting are realized by bombardment of electron beam to trichromatic fluorescence powders of red, green and blue. The field emission devices have potential advantages in the aspects such as brightness, viewing angle, response time, range of operating temperature and energy consumption.

One of the key factors of the preparation of field emission devices with excellent properties is the preparation of luminous material with excellent properties, and that is the preparation of fluorescence powders. Currently, the fluorescence materials used in field emission devices mainly are the fluorescence powders of series sulfide, series oxide and series oxysulfide used in traditional cathode ray tube and projection television tubes. The fluorescence powders of series sulfide and series oxide have high brightness and certain electrical conductivity, while these fluorescence powders are prone to be decomposed under the bombardment of large electron beam, could produce sulfur to poison the cathode tip, and could generate other sediment covering the fluorescence powders surface, thus reducing the luminescence efficiency of the fluorescence powders and decreasing the lifetime of the field emission devices. The fluorescence powders of series oxide have good stability, while their luminescence efficiency are not high enough, and they are generally made from insulators materials. The borate luminous material of series sulfide, series oxide and series oxysulfide can not meet needs of the above properties, and the properties of these series are to be improved and enhanced.

SUMMARY OF THE INVENTION

In view of this, the present invention provides borate luminous material, which has high luminescence efficiency and good stability. Meanwhile, the present invention provides the preparation method of borate luminous material, which is easy to carry out, the quality of the products are high and the costs is low.

Borate luminous material, which comprises the compound of following structural formula: $M_2(Re_{1-x}Ln_x)_2B_2O_7$, wherein x is in a range of $0<x\leq0.5$, M is alkali metal element, Ln is at least one of Tm, Tb, Eu, Sm, Pr, Dy, Ce and Bi, Re is selected from one or more element of Y, Gd, Sc, Lu and La.

And, preparation method of borate luminous material, comprising the steps of:

using the compound used as the source of alkali metal element $M^+$, the compound used as the source of $Re^{3+}$, the compound used as the source of Ln ion, and boric acid or boron oxide as raw materials, all the raw materials are added at the molar ratio of the elements in the structure formula $M_2(Re_{1-x}Ln_x)_2B_2O_7$, wherein, x is in a range of $0<x\leq0.5$, M is alkali metal element, Re is selected from one or more element of Y, Gd, Sc, Lu and La, Ln is at least one of Tm, Tb, Eu, Sm, Pr, Dy, Ce and Bi;

grinding and mixing all the raw materials homogeneously;

calcining the mixed raw materials and cooling them to obtain the borate luminous material.

In the above borate luminous material, the use of $M_2(Re_{1-x}Ln_x)_2B_2O_7$ series oxide doped with rare earth, not only could avoid the poison problem of sulfur in the series sulfide, but also could eliminate the disadvantages that the luminescence efficiency of traditional series oxide are low, thus makes the borate luminous material has good chemical stability while have high luminescence efficiency. In addition, the borate luminous material has high color purity. In the above preparation method of borate luminous material, the preparation method has fewer process steps such as grinding and calcining, and these steps are easy to carry out, the requirements of the steps are low, thus the costs are low. Moreover, the method provides final products, and there is no other metal ion or other oxide has been introduced into the compound used as the source of every elements of the final products, thus the final products $M_2(Re_{1-x}Ln_x)_2B_2O_7$ have high purity, and greatly improve the color purity of borate luminous material which is emitting light, furthermore, the products made by the borate luminous material have high quality.

BRIEF DESCRIPTION OF THE DRAWINGS

Further description of the present invention will be illustrated, which combined with embodiments in the drawings.

DETAILED DESCRIPTION OF ILLUSTRATED EMBODIMENTS

Figure 1:
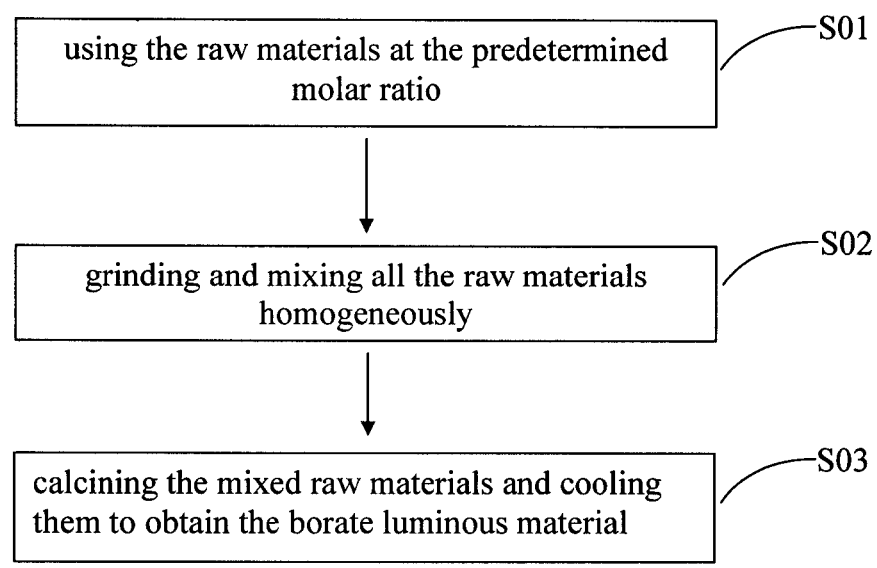
FIG. 1 shows the flow chart of the preparation method of borate luminous material in embodiments of the present invention.

Further description of the present invention will be illustrated, which combined with embodiments in the drawings, in order to make the purpose, the technical solution and the advantages clearer. While the present invention has been described with reference to particular embodiments, it will be understood that the embodiments are illustrative and that the invention scope is not so limited.

Borate luminous material of the embodiments comprises the compound of following structural formula: $M_2(Re_{1-x}Ln_x)_2B_2O_7$, wherein x is in a range of $0<x\leq0.5$, M is alkali metal element, Ln is at least one of Tm, Tb, Eu, Sm, Pr, Dy, Ce and Bi, Re is selected from one or more element of Y, Gd, Sc, Lu and La.

Specifically, preferred, the value of x is in a range of: $0.001\leq x\leq0.4$, and alkali metal element is at least one of Na, K, and Li. Re is element Y, or the combination of element Y and at least one of Gd, Sc, Lu and La. That is, in one embodiment of the borate luminous material of the present invention, the borate luminous material is the compound $M_2(Re_{1-x}Ln_x)_2B_2O_7$, so Re is element Y. In another embodiment of the borate luminous material of the present invention, the borate luminous material also is the compound $M_2(Re_{1-x}Ln_x)_2B_2O_7$, so Re is element Y, but the difference is that, the element Y is partly or all replaced by at least one of the element of Gd, Sc, Lu and La.

In addition, in the metal Ln, the Tm, Tb, Eu, Sm, Pr, Dy and Ce all are rare earth elements, as dopants, they are contribute to luminescence of the luminescence material. Bi is the fifth group elements, herein, element Bi is luminescence dopant as the rare earth.

See FIG. 1, the preparation method of the above borate luminous material, comprising the steps of:

S01: using the raw materials at the predetermined molar ratio, that is using the compound used as the source of alkali metal element $M^+$, the compound used as the source of $Re^{3+}$, the compound used as the source of Ln ion, and boric acid or boron oxide as raw materials, all the raw materials are added at the molar ratio of the elements in the structure formula $M_2(Re_{1-x}Ln_x)_2B_2O_7$, wherein, x is in a range of $0<x\leq0.5$, M is alkali metal element, Re is selected from one or more element of Y, Gd, Sc, Lu and La, Ln is at least one of Tm, Tb, Eu, Sm, Pr, Dy, Ce and Bi;

S02: grinding and mixing all the raw materials homogeneously;

S03: calcining the mixed raw materials and cooling them to obtain the borate luminous material.

In step SOL the source of alkali metal element $M^+$ is at least one of carbonate and oxalate, the compound used as the source of $Re^{3+}$ is at least one of its oxide, chloride, nitrate, carbonate and oxalate, the compound used as the source of Ln ion is at least one of its oxide, chloride, nitrate, carbonate and oxalate. Specifically, preferred, the alkali metal element is at least one of Na, K, and Li, the value of the X is in a range of $0.001\leq x\leq0.4$. Preferred, Re is element Y, that is, in one embodiment of the borate luminous material of the present invention, the borate luminous material is the compound $M_2(Re_{1-x}Ln_x)_2B_2O_7$. In another embodiment of the borate luminous material of the present invention, the borate luminous material also is the compound $M_2(Re_{1-x}Ln_x)_2B_2O_7$, and the difference is that, the element Y is partly or all replaced by at least one element of Gd, Sc, Lu and La.

The step S02 could be achieved by various method. including but not limited to high temperature solid state method. Specifically, the high temperature solid state method comprising: the raw materials are grinded and mixed homogeneously to form powder, and then go to step S03. The calcining proceed in the step 3 comprising: pre-calcining the grinded powders at the temperature in a range of 600 to 800° C. for 0.5 to 2 h, and sintering at the temperature in a range of 900 to 1300° C. for 1 to 20 h. Preferred, the pre-calcining temperature is in a range of 650 to 800° C., the pre-calcining time is in a range of 1 to 1.5 h, the sintering temperature is in a range of 1000 to 1200° C., the sintering time is in a range of 4 to 15 h.

In addition, the calcining proceed in the step 3 is taken in reducing atmosphere, such as but not limited to reducing atmosphere of 95% (V) $N_2$+5% (V) $H_2$, and the calcining temperature is in a range of 1000 to 1150° C., the sintering time is in a range of 4 to 15 h. Certainly, it should be understand that, the calcining proceed could be taken in the inert gas protective atmosphere without reducing gas (such as but not limited to nitrogen or inert gas).

The borate luminous material of different composition, preparation method and properties are illustrated in the following embodiments.

Embodiment 1 preparation of $K_2(Y_{0.999}Tm_{0.001})_2B_2O_7$ by high temperature solid state method Adding 0.6910 g $K_2CO_3$, 2.7462 g $Y(NO_3)_3$, 0.025 g $Tm_2(CO_3)_3$ and 0.6184 g $H_3BO_3$ into a agate mortar under room temperature, grinding them homogeneously to form powder, transferring the grinded powder to a corundum crucible and pre-calcining at 600° C. for 1 h, and placing into a high-temperature box-type furnace and sintering at 1300° C. for 1 h, and then natural cooling the sintered product to the room temperature and grinding them in mortar, finally obtaining the luminous material $K_2(Y_{0.999}Tm_{0.001})_2B_2O_7$ which can emit blue light in the excitation of the electron beam.

Embodiment 2 preparation of $Li_2(Sc_{0.995}Sm_{0.005})_2B_2O_7$ by high temperature solid state method Adding 0.3694 g $Li_2CO_3$, 0.6861 g $Sc_2O_3$, 0.0128 g $SmCl_3$ and 0.3481 g $B_2O_3$ into a agate mortar under room temperature, grinding them homogeneously to form powder, transferring the grinded powder to a corundum crucible and pre-calcining at 800° C. for 0.5 h, and placing into a high-temperature box-type furnace and sintering at 1200° C. for 10 h, and then natural cooling the sintered product to the room temperature and grinding them in mortar, finally obtaining the luminous material $Li_2(Sc_{0.995}Sm_{0.005})_2B_2O_7$ which can emit red light in the excitation of the electron beam.

Embodiment 3 preparation of $Na_2(Y_{0.946}Sc_{0.05}Pr_{0.004})_2B_2O_7$ by high temperature solid state method Adding 0.6700 g $Na_2C_2O_4$, 1.8471 g $YCl_3$, 0.0344 g $Sc_2O_3$ and 0.0021 g $Pr_6O_{11}$ and 0.6184 g $H_3BO_3$ into a agate mortar under room temperature, grinding them homogeneously to form powder, transferring the grinded powder to a corundum crucible and pre-calcining at 700° C. for 0.5 h, and placing into a high-temperature box-type furnace and sintering at 1000° C. for 16 h in weak reducing atmosphere of 95% (V) $N_2$+5% (V) $H_2$, and then natural cooling the sintered product to the room temperature and grinding them in mortar, finally obtaining the luminous material $Na_2(Y_{0.946}Sc_{0.05}Pr_{0.004})_2B_2O_7$ which can emit red light in the excitation of the electron beam.

Embodiment 4 preparation of $Na_2(Y_{0.85}Tb_{0.15})_2B_2O_7$ by high temperature solid state method Adding 0.5299 g $Na_2CO_3$, 0.9596 g $Y_2O_3$, 0.2802 g $Tb_4O_7$ and 0.6184 g $H_3BO_3$ into a agate mortar under room temperature, grinding them homogeneously to form powder, transferring the grinded powder to a corundum crucible and pre-calcining at 700° C. for 1 h, and placing into a high-temperature box-type furnace and sintering at 1000° C. for 4 h in weak reducing atmosphere of 95% (V) $N_2$+5% (V) $H_2$, and then natural cooling the sintered product to the room temperature and grinding them in mortar, finally obtaining the luminous material $Na_2(Y_{0.85}Tb_{0.15})_2B_2O_7$ which can emit green light in the excitation of the electron beam.

Embodiment 5 preparation of $Li_2(Y_{0.9}Gd_{0.08}Sm_{0.02})_2B_2O_7$ by high temperature solid state method Adding 0.5095 g $Li_2C_2O_4$, 1.6101 g $Y_2(CO_3)_3$, 0.1450 g $Gd_2O_3$, 0.0480 g $Sm_2(CO_3)_3$ and 0.3481 g $B_2O_3$ into a agate mortar under room temperature, grinding them homogeneously to form powder, transferring the grinded powder to a corundum crucible and pre-calcining at 800° C. for 1 h, and placing into a high-temperature box-type furnace and sintering at 900° C. for 20 h, and then natural cooling the sintered product to the room temperature and grinding them in mortar, finally obtaining the luminous material $Li_2(Y_{0.9}Gd_{0.08}Sm_{0.02})_2B_2O_7$ which can emit orange red light in the excitation of the electron beam.

Embodiment 6 preparation of $Na_2(Y_{0.995}Tm_{0.005})_2B_2O_7$ by high temperature solid state method Adding 0.5299 g $Na_2CO_3$, 1.1233 g $Y_2O_3$, 0.0096 g $Tm_2O_3$ and 0.6184 g $H_3BO_3$ into a agate mortar under room temperature, grinding them homogeneously to form powder, transferring the grinded powder to a corundum crucible and pre-calcining at 700° C. for 1 h, and placing into a high-temperature box-type furnace and sintering at 1000° C. for 4 h, and then natural cooling the sintered product to the room temperature and grinding them in mortar, finally obtaining the luminous material $Na_2(Y_{0.995}Tm_{0.005})_2B_2O_7$ which can emit blue light in the excitation of the electron beam.

Embodiment 7 preparation of $K_2(Y_{0.79}Gd_{0.2}Dy_{0.01})_2B_2O_7$ by high temperature solid state method Adding 0.8300 g $K_2C_2O_4$, 1.5425 g $YCl_3$, 0.3625 g $Gd_2O_3$, 0.0186 g $Dy_2O_3$ and 0.6184 g $H_3BO_3$ into a agate mortar under room temperature, grinding them homogeneously to form powder, transferring the grinded powder to a corundum crucible and pre-calcining at 600° C. for 2 h, and placing into a high-temperature box-type furnace and sintering at 1100° C. for 15 h, and then natural cooling the sintered product to the room temperature and grinding them in mortar, finally obtaining the luminous material $K_2(Y_{0.79}Gd_{0.2}Dy_{0.01})_2B_2O_7$ which can emit almost white light in the excitation of the electron beam.

Embodiment 8 preparation of $Na_2(Y_{0.96}Eu_{0.04})_2B_2O_7$ by high temperature solid state method Adding 0.5299 g $Na_2CO_3$, 1.0838 g $Y_2O_3$, 0.0703 $Eu_2O_3$ and 0.6184 g $H_3BO_3$ into a agate mortar under room temperature, grinding them homogeneously to form powder, transferring the grinded powder to a corundum crucible and pre-calcining at 700° C. for 1 h, and placing into a high-temperature box-type furnace and sintering at 1000° C. for 4 h, and then natural cooling the sintered product to the room temperature and grinding them in mortar, finally obtaining the luminous material $Na_2(Y_{0.96}Eu_{0.04})_2B_2O_7$ which can emit red light in the excitation of the electron beam.

Embodiment 9 preparation of $Na_2(Y_{0.9985}Bi_{0.0015})_2B_2O_7$ by high temperature solid state method Adding 0.5299 g $Na_2CO_3$, 1.1273 g $Y_2O_3$, 0.0034 g $Bi_2O_3$ and 0.6184 g $H_3BO_3$ into a agate mortar under room temperature, grinding them homogeneously to form powder, transferring the grinded powder to a corundum crucible and pre-calcining at 700° C. for 1 h, and placing into a high-temperature box-type furnace and sintering at 1000° C. for 4 h, and then natural cooling the sintered product to the room temperature and grinding them in mortar, finally obtaining the luminous material $Na_2(Y_{0.9985}Bi_{0.0015})_2B_2O_7$ which can emit ultraviolet light in the excitation of the electron beam.

Embodiment 10 preparation of $Na_2(Y_{0.3}Lu_{0.5}Tb_{0.2})_2B_2O_7$ by high temperature solid state method Adding 0.6700 g $Na_2C_2O_4$, 0.5857 g $YCl_3$, 1.4066 g $LuCl_3$, 0.5305 g $TbCl_3$ and 0.3481 g $B_2O_3$ into a agate mortar under room temperature, grinding them homogeneously to form powder, transferring the grinded powder to a corundum crucible and pre-calcining at 700° C. for 0.5 h, and placing into a high-temperature box-type furnace and sintering at 1250° C. for 8 h in weak reducing atmosphere of 95% (V) $N_2$+5% (V) $H_2$, and then natural cooling the sintered product to the room temperature and grinding them in mortar, finally obtaining the luminous material $Na_2(Y_{0.3}Lu_{0.5}Tb_{0.2})_2B_2O_7$ which can emit green light in the excitation of the electron beam.

Embodiment 11 preparation of $Na_2(Y_{0.9985}Ce_{0.0015})_2B_2O_7$ by high temperature solid state method Adding 0.5299 g $Na_2CO_3$, 1.1273 g $Y_2O_3$, 0.0025 g $CeO_2$ and 0.6184 g $H_3BO_3$ into a agate mortar under room temperature, grinding them homogeneously to form powder, transferring the grinded powder to a corundum crucible and pre-calcining at 700° C. for 1 h, and placing into a high-temperature box-type furnace and sintering at 1000° C. for 4 h in weak reducing atmosphere of 95% (V) $N_2$+5% (V) $H_2$, and then natural cooling the sintered product to the room temperature and grinding them in mortar, finally obtaining the luminous material $Na_2(Y_{0.9985}Ce_{0.0015})_2B_2O_7$ which can emit blue light in the excitation of the electron beam.

Embodiment 12 preparation of $Li_2(Y_{0.3}La_{0.3}Eu_{0.4})_2B_2O_7$ by high temperature solid state method Adding 0.3694 g $Li_2CO_3$, 0.5367 g $Y_2(CO_3)_3$, 0.7357 g $LaCl_3$, 0.7038 g $Eu_2O_3$ and 0.3481 g $B_2O_3$ into a agate mortar under room temperature, grinding them homogeneously to form powder, transferring the grinded powder to a corundum crucible and pre-calcining at 800° C. for 1 h, and placing into a high-temperature box-type furnace and sintering at 1150° C. for 6 h, and then natural cooling the sintered product to the room temperature and grinding them in mortar, finally obtaining the luminous material $Li_2(Y_{0.3}La_{0.3}Eu_{0.4})_2B_2O_7$ which can emit red light in the excitation of the electron beam.

Embodiment 13 preparation of $Na_2(Gd_{0.8}Tb_{0.2})_2B_2O_7$ by high temperature solid state method Adding 0.5299 g $Na_2CO_3$, 2.1220 g $Gd_2(C_2O_4)_3$, 0.3736 g $Tb_4O_7$ and 0.6184 g $H_3BO_3$ into a agate mortar under room temperature, grinding them homogeneously to form powder, transferring the grinded powder to a corundum crucible and pre-calcining at 800° C. for 0.5 h, and placing into a high-temperature box-type furnace and sintering at 1350° C. for 5 h in weak reducing atmosphere of 95% (V) $N_2$+5% (V) $H_2$, and then natural cooling the sintered product to the room temperature and grinding them in mortar, finally obtaining the luminous material $Na_2(Gd_{0.8}Tb_{0.2})_2B_2O_7$ which can emit green light in the excitation of the electron beam.

Embodiment 14 preparation of $Na_2(Y_{0.5}Tb_{0.5})_2B_2O_7$ by high temperature solid state method Adding 0.5299 g $Na_2CO_3$, 0.5645 g $Y_2O_3$, 0.9340 g $Tb_4O_7$ and 0.6184 g $H_3BO_3$ into a agate mortar under room temperature, grinding them homogeneously to form powder, transferring the grinded powder to a corundum crucible and pre-calcining at 700° C. for 1 h, and placing into a high-temperature box-type furnace and sintering at 1000° C. for 4 h in weak reducing atmosphere of 95% (V) $N_2$+5% (V) $H_2$, and then natural cooling the sintered product to the room temperature and grinding them in mortar, finally obtaining the luminous material $Na_2(Y_{0.5}Tb_{0.5})_2B_2O_7$ which can emit green light in the excitation of the electron beam.

Besides, to illustrate the luminescence properties of the borate luminous material prepared in embodiment 4, the embodiments selectively provide the emission spectra of the borate luminous material prepared in embodiment 4, 6, 8, 9, 11 and 14. These will not be described in the follows.

Figure 2:
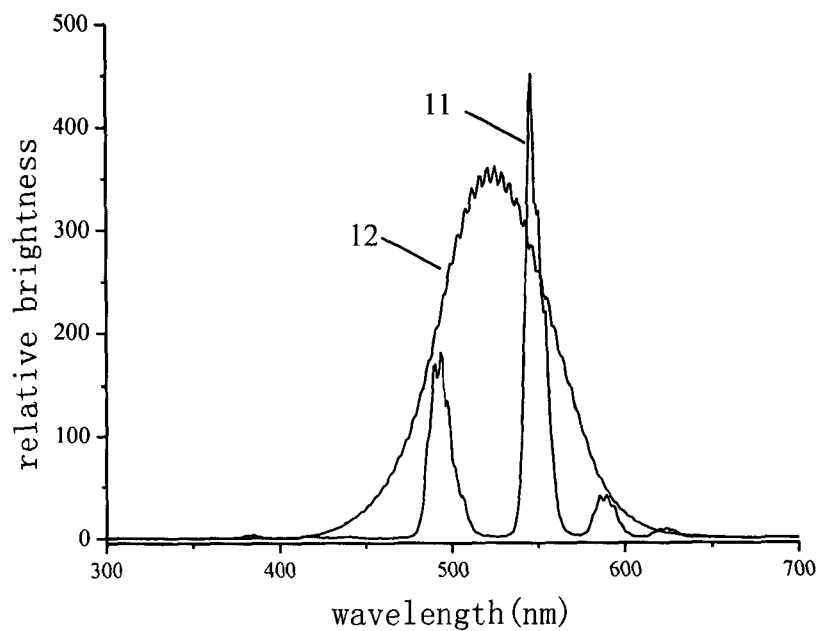
FIG. 2 shows the differences in the emission spectra of the comparison of the borate luminous material which is prepared in embodiment 4, and the green fluorescence powders (ZnS:Cu, Au, Al) bought from present commercial sales. These emission spectra are analysised by spectrometer of Daojin RF-5301PC as detector, and the tests condition of the following emission spectras are the same, these will not be elaborated in the follows.

FIG. 2 shows the differences in the emission spectra of the comparison of the borate luminous material which is prepared in embodiment 4, and the green fluorescence powders (ZnS:Cu, Au, Al) bought from present commercial sales. The diffraction peak position of the borate luminous material which is prepared in embodiment 4 is consistent with the diffraction peak position of the standard card (PDF35-0405) of pure phase $Na_3YSi_2O_7$. Wherein, the green fluorescence powders (ZnS:Cu, Au, Al) bought from present commercial sales is the green fluorescence powders ZnS doped with ion Cu, Au and Al. See FIG. 2, the luminous material prepared in embodiment 4 have a strong emission peak at 544 nm, and the luminescence intensity is stronger than that of the green fluorescence powders (ZnS:Cu, Au, Al) bought from present commercial sales. While, the luminous material prepared in embodiment 4 have the properties of good stability, high color purity and high luminescence efficiency. Meanwhile, the luminous material prepared in embodiment 6, 8, 9, 11 and 14 have similar properties, these will not be elaborated in the follows.

Figure 3:
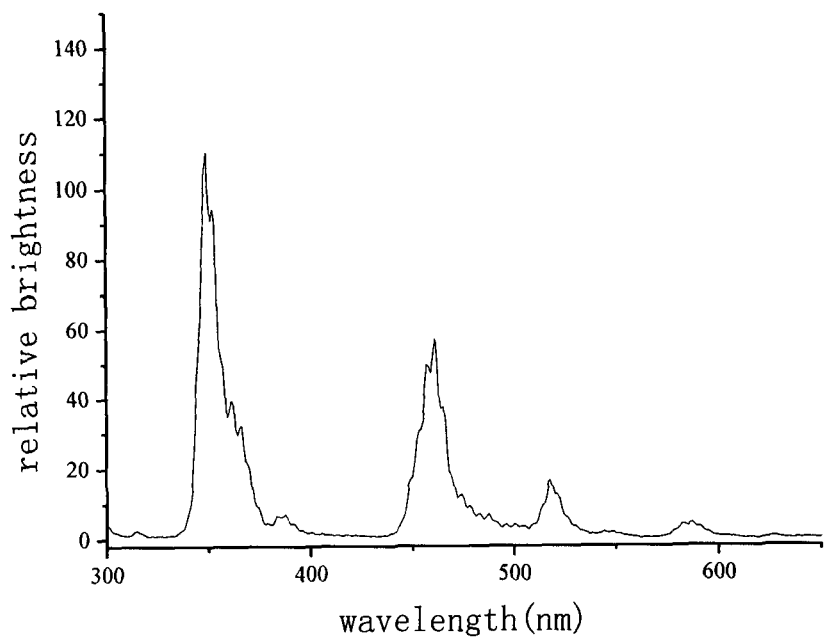
FIG. 3 shows the cathode ray emission spectra of the borate luminous material which is prepared in embodiment 6.

FIG. 3 shows the cathode ray emission spectra of the borate luminous material which is prepared in embodiment 6. As shown in FIG. 3, the luminous material prepared in the present embodiment emit narrow band blue spectra at 460 nm. As the same, the luminous material prepared in embodiment 6 have the properties of good stability, high color purity and high luminescence efficiency.

Figure 4:
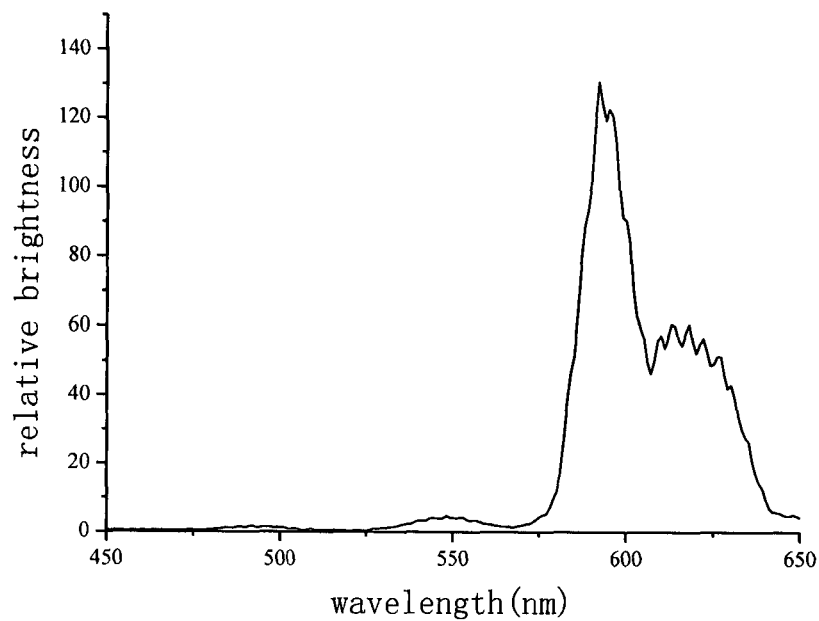
FIG. 4 shows the cathode ray emission spectra of the borate luminous material which is prepared in embodiment 8.

FIG. 4 shows the cathode ray emission spectra of the borate luminous material which is prepared in embodiment 8. As shown in FIG. 4, the luminous material prepared in the present embodiment 8 emit narrow band red spectra at 614 nm.

Figure 5:
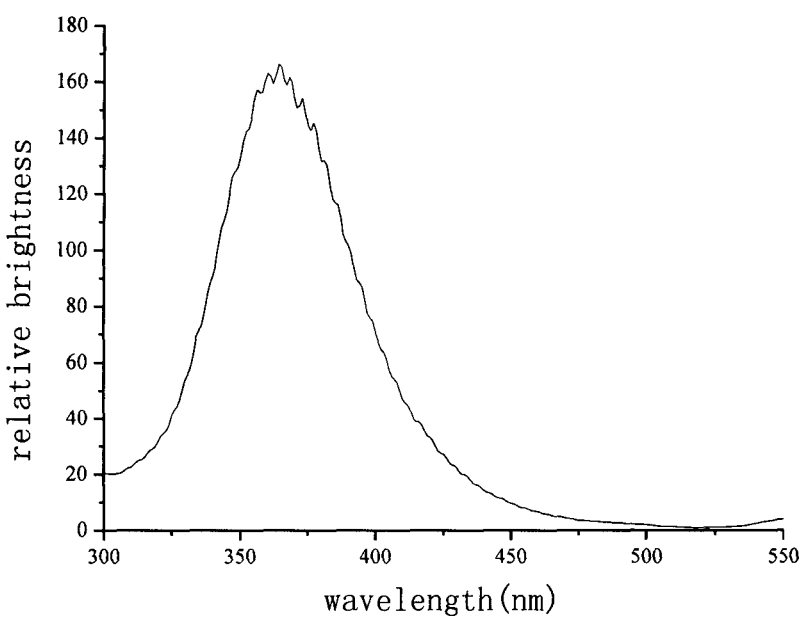
FIG. 5 shows the cathode ray emission spectra of the borate luminous material which is prepared in embodiment 9.

FIG. 5 shows the cathode ray emission spectra of the borate luminous material which is prepared in embodiment 9. As shown in FIG. 5, the luminous material prepared in the present embodiment 9 emit broad band ultraviolet spectra at 365 nm.

Figure 6:
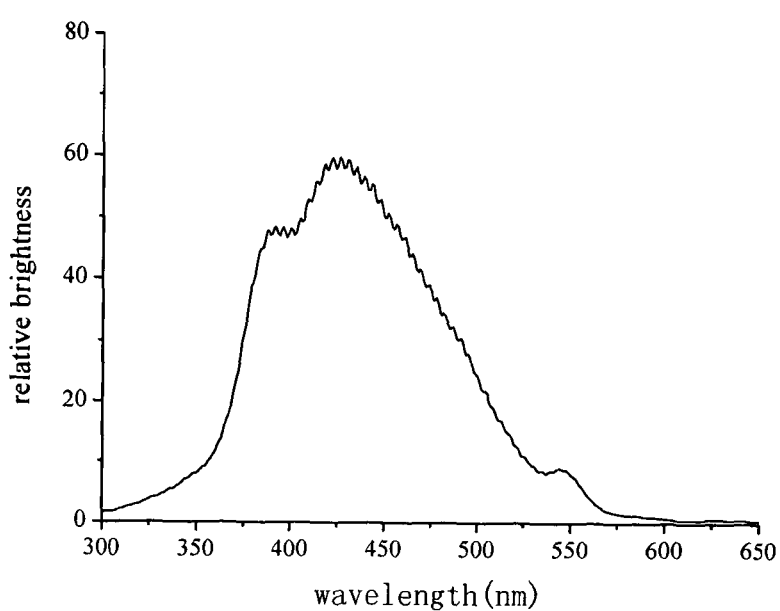
FIG. 6 shows the cathode ray emission spectra of the borate luminous material which is prepared in embodiment 11.

FIG. 6 shows the cathode ray emission spectra of the borate luminous material which is prepared in embodiment 11. As shown in FIG. 6, the luminous material prepared in the present embodiment 11 emit broad band blue spectra at 432 nm.

Figure 7:
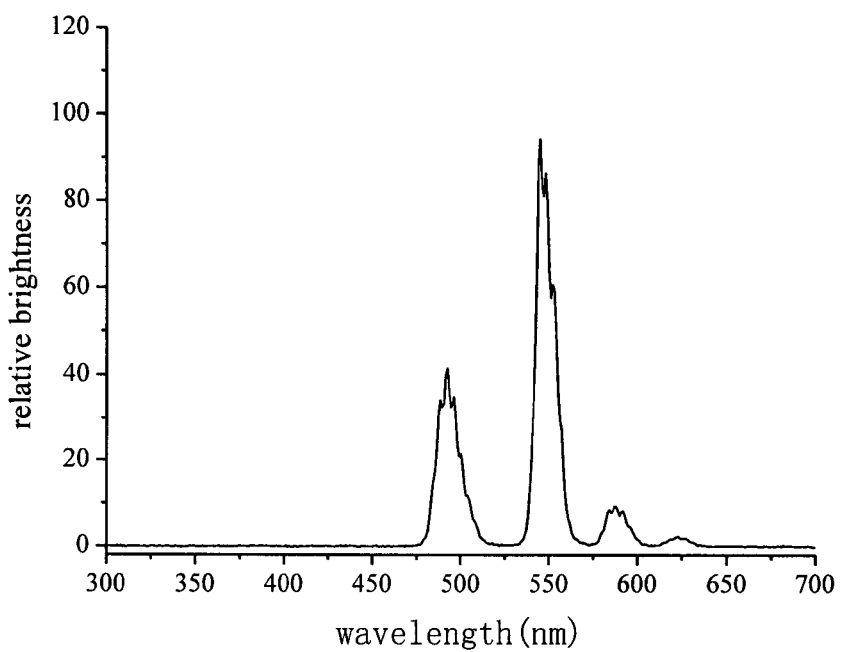
FIG. 7 shows the cathode ray emission spectra of the borate luminous material which is prepared in embodiment 14.

FIG. 7 shows the cathode ray emission spectra of the borate luminous material which is prepared in embodiment 14. As shown in FIG. 7, the luminous material prepared in the present embodiment 14 emit narrow band green spectra at 544 nm.

By the above embodiments, it is known that the luminescence efficiency of the above borate luminous material is stronger than that of the fluorescence powders in the prior art, and the use of $M_2(Re_{1-x}Ln_x)_2B_2O_7$ series oxide doped with rare earth, not only could avoid the poison problem of sulfur in the series sulfide, but also could eliminate the disadvantages that the luminescence efficiency of traditional series oxide are low, thus makes the borate luminous material has good chemical stability while have high luminescence efficiency. In addition, the borate luminous material has high color purity. In the above preparation method of borate luminous material, the preparation method has fewer process steps such as grinding and calcining, and these steps are easy to carry out, the requirements of the steps are low, thus the costs are low. Moreover, the method provides final products, and there is no other metal ion or other oxide has been introduced into the compound used as the source of every elements of the final products, thus the final products $M_2(Re_{1-x}Ln_x)_2B_2O_7$ have high purity, and greatly improve the color purity of borate luminous material which is emitting light, furthermore, the products made by the borate luminous material has high quality.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. Borate luminous material, wherein, comprises the compound of following structural formula: $M_2(Re_{1-x}Ln_x)_2B_2O_7$, wherein x is in a range of 0<x≤0.5, M is alkali metal element, Ln is at least one of Tm, Eu, Sm, Pr, Dy and Bi, Re is selected from one or more element of Y, Gd, Sc, Lu and La.

2. Borate luminous material according to claim 1, wherein, the value of said x is in a range of: 0.001≤x≤0.4.

3. Borate luminous material according to claim 1, wherein, said alkali metal element is at least one of Na, K, and Li.

4. Borate luminous material according to claim 1, wherein, said Re is element Y.

5. Borate luminous material according to claim 1, wherein, said Re is the combination of element Y and at least one element of Gd, Sc, Lu and La.

6. Preparation method of borate luminous material, wherein, comprising the steps of: using the compound used as the source of alkali metal element $M^+$, the compound used as the source of $Re^{3+}$, the compound used as the source of Ln ion, and boric acid or boron oxide as raw materials, wherein, all the raw materials are added at the molar ratio of the elements in the structure formula $M_2(Re_{1-x}Ln_x)_2B_2O_7$, wherein, 0<x≤0.5, M is alkali metal element, Re is selected from one or more element of Y, Gd, Sc, Lu and La, Ln is at least one of Tm, Eu, Sm, Pr, Dy and Bi; grinding and mixing all said raw materials homogeneously; calcining the mixed raw materials and cooling them to obtain the borate luminous material, wherein, said calcining proceed comprising: pre-calcining the grinded powders at the temperature in a range of 600 to 800° C. for 0.5 to 2 h, and sintering at the temperature in a range of 900 to 1300° C. for 1 to 20 h.

7. Preparation method of borate luminous material according to claim 6, wherein, the value of said x is in a range of: 0.001≤x≤0.4.

8. Preparation method of borate luminous material according to claim 6, wherein, said Re is element Y, or the combination of element Y and at least one element of Gd, Sc, Lu and La.

9. Preparation method of borate luminous material according to claim 6, wherein, said source of alkali metal element $M^+$ is at least one of carbonate and oxalate, said compound used as the source of $Re^{3+}$ is at least one of its oxide, chloride, nitrate, carbonate and oxalate, said compound used as the source of Ln ion is at least one of its oxide, chloride, nitrate, carbonate and oxalate.

* * * * *